(12) United States Patent
Filgueiras de Araujo et al.

(10) Patent No.: US 10,402,448 B2
(45) Date of Patent: Sep. 3, 2019

(54) IMAGE RETRIEVAL WITH DEEP LOCAL FEATURE DESCRIPTORS AND ATTENTION-BASED KEYPOINT DESCRIPTORS

(71) Applicant: Google Inc., Mountain View, CA (US)

(72) Inventors: Andre Filgueiras de Araujo, Mountain View, CA (US); Jiwoong Sim, Los Angeles, CA (US); Bohyung Han, Seoul (KR); Hyeonwoo Noh, Gyeongbuk (KR)

(73) Assignee: Google LLC, Mountain View, CA (US)

( * ) Notice: Subject to any disclaimer, the term of this patent is extended or adjusted under 35 U.S.C. 154(b) by 82 days.

(21) Appl. No.: 15/635,387

(22) Filed: Jun. 28, 2017

(65) Prior Publication Data
US 2019/0005069 A1    Jan. 3, 2019

(51) Int. Cl.
| | |
|---|---|
| G06K 9/62 | (2006.01) |
| G06F 16/583 | (2019.01) |
| G06K 9/66 | (2006.01) |
| G06K 9/46 | (2006.01) |
| G06K 9/00 | (2006.01) |

(52) U.S. Cl.
CPC ..... *G06F 16/5854* (2019.01); *G06K 9/00684* (2013.01); *G06K 9/4628* (2013.01); *G06K 9/4671* (2013.01); *G06K 9/6211* (2013.01); *G06K 9/66* (2013.01)

(58) Field of Classification Search
CPC ............. G06K 9/6215; G06K 9/4671; G06K 9/00201; G06F 17/30247; G06F 17/30259
USPC ............................................. 382/159
See application file for complete search history.

(56) References Cited

U.S. PATENT DOCUMENTS

| | | | |
|---|---|---|---|
| 8,098,938 B1 | 1/2012 | Buddemeier et al. | |
| 8,306,315 B2 * | 11/2012 | Inoue | G06F 17/30247 382/154 |

(Continued)

OTHER PUBLICATIONS

Aradhye et al., "Video2Text: Learning to Annotate Video Content", IEEE International Conference on Data Mining Workshops, Miami, Florida, Dec. 6, 2009, pp. 144-151.

(Continued)

*Primary Examiner* — Charlotte M Baker
(74) *Attorney, Agent, or Firm* — Dority & Manning, P.A.

(57) ABSTRACT

Systems and methods of the present disclosure can use machine-learned image descriptor models for image retrieval applications and other applications. A trained image descriptor model can be used to analyze a plurality of database images to create a large-scale index of keypoint descriptors associated with the database images. An image retrieval application can provide a query image as input to the trained image descriptor model, resulting in receipt of a set of keypoint descriptors associated with the query image. Keypoint descriptors associated with the query image can be analyzed relative to the index to determine matching descriptors (e.g., by implementing a nearest neighbor search). Matching descriptors can then be geometrically verified and used to identify one or more matching images from the plurality of database images to retrieve and provide as output (e.g., by providing for display) within the image retrieval application.

19 Claims, 9 Drawing Sheets

(56) References Cited

U.S. PATENT DOCUMENTS 9,818,195 B2 * 11/2017 Zach .................. G06K 9/52
2014/0310314 A1 * 10/2014 Li .................. G06F 17/30247
707/780

OTHER PUBLICATIONS

Arandjelovic et al., "NetVLAD: CNN Architecture for Weakly Supervised Place Recognition", 29th Conference on Computer Vision and Pattern Recognition, Las Vegas, Nevada, Jun. 26-Jul. 1, 2016, pp. 5297-5307.
Babenko et al., "Aggregating Local Deep Features for Image Retrieval", International Conference on Computer Vision, Santiago, Chile, Dec. 11-18, 2015, pp. 1269-1277.
Babenko et al., "Neural Codes for Image Retrieval", European Conference on Computer Vision, Zurich, Switzerland, Sep. 6-12, 2014, pp. 584-599.
Bay et al., "Speeded-Up Robust Features (SURF)", Computer Vision and Image Understanding, vol. 110, Issue 3, 2008, pp. 346-359.
Beis et al., "Shape Indexing Using Approximate Nearest-Neighbour Search in High-Dimensional Spaces", Conference on Computer Vision and Pattern Recognition, San Juan, Puerto Rico, Jun. 17-19, 1997, pp. 1000-1006.
Bentley, "Multidimensional Binary Search Trees Used for Associative Searching", Communications of the ACM, vol. 18, Issue 9, Sep. 1975, pp. 509-517.
Dugas et al., "Incorporating Second-Order Functional Knowledge for Better Option Pricing", Conference on Advances in Neural Information Processing Systems 13, Denver, Colorado, Nov. 30-Dec. 2, 2000 pp. 451-457.
Fischler et al., "Random Sample Consensus: A Paradigm for Model Fitting with Applications to Image Analysis and Automated Cartography", Communications of the ACM, vol. 24, Issue 6, Jun. 1981, pp. 381-395.
Gordo et al., Deep Image Retrieval: Learning Global Representations for Image Search, European Conference on Computer Vision, Amsterdam, The Netherlands, Oct. 8-16, 2016. pp. 241-257.
Han et al., "MatchNet: Unifying Feature and Metric Learning for Patch-Based Matching", IEEE Conference on Computer Vision and Pattern Recognition, Boston, Massachusetts, Jun. 7-12, 2015, pp. 3279-3286.
He et al., "Deep Residual Learning for Image Recognition", Conference on Computer Vision and Pattern Recognition, Las Vegas, Nevada, Jun. 26-Jul. 1, 2016, pp. 770-778.
Hong et al., "Decoupled Deep Neural Network for Semi-Supervised Semantic Segmentation", 28th International Conference on Neural Information Processing Systems, Montreal, Canada, Dec. 7-12, 2015, pp. 1495-1503.
Jegou et al., "Negative Evidences and Co-Occurrences in Image Retrieval: The Benefit of PCA and Whitening", European Conference on Computer Vision, Firenze, Italy, Oct. 7-13, 2012, pp. 774-787.
Jegou et al., "Hamming Embedding and Weak Geometric Consistency for Large Scale Image Search", European Conference on Computer Vision, Marseille, France, Oct. 12-18, 2008, pp. 304-317.
Jegou et al., "Aggregating Local Descriptors into a Compact Image Representation", Conference on Computer Vision and Pattern Recognition, San Francisco, Jun. 13-18, 2010, pp. 3304-3311.
Jegou et al., "Aggregating Local Image Descriptors into Compact Codes", IEEE Transactions on Pattern Analysis and Machine Intelligence, vol. 34, Issue 9, Sep. 2012, pp. 1704-1716.
Jegou et al., "Product Quantization for Nearest Neighbor Search", IEEE Transactions on Pattern Analysis and Machine Intelligence, vol. 33, Issue 1, Jan. 2011, pp. 117-128.
Kalantidis et al., "Locally Optimized Product Quantization for Approximate Nearest Neighbor Search", Conference on Computer Vision and Pattern Recognition, Columbus, Ohio, Jun. 24-27, 2014, pp. 2329-2336.
Kalantidis et al., "Cross-Dimensional Weighting for Aggregated Deep Convolutional Features", European Conference on Computer Vision Workshops, Amsterdam, The Netherlands, Oct. 15-16, 2016, pp. 685-701.
Lowe, "Distinctive Image Features from Scale-Invariant Keypoints", International Journal of Computer Vision, vol. 60, Issue 2, Nov. 2004, pp. 91-110.
Neven et al., "Image Recognition with an Adiabatic Quantum Computer I. Mapping to Quadratic Unconstrained Binary Optimization", arXiv:0804,4457, Apr. 28, 2008, 7 pages.
Ng et al., "Exploiting Local Features from Deep Networks for Image Retrieval", Conference on Computer Vision and Pattern Recognition Workshops, Boston, Massachusetts, Jun. 11-12, 2015, pp. 53-61.
Nister et al., "Scalable Recognition with Vocabulary Tree", Conference on Computer Vision and Pattern Recognition, New York, New York, Jun. 17-22, 2006, pp. 2161-2168.
Philbin et al., "Object Retrieval with Large Vocabularies and Fast Spatial Matching", Conference on Computer Vision and Pattern Recognition, Minneapolis, Minnesota, Jun. 17-22, 2007, pp. 1-8.
Philbin et al., "Lost in Quantization: Improving Particular Object Retrieval in Large Scale Image Databases" Conference on Computer Vision and Pattern Recognition, Anchorage, Alaska, Jun. 24-26, 2008, pp. 1-8.
Radenovic et al., "CNN Image Retrieval Learns from BoW: Unsupervised Fine-Tuning with Hard Examples", European Conference on Computer Vision, Amsterdam, The Netherlands, Oct. 8-16, 2016, pp. 3-20.
Ren et al., "Faster R-CNN: Towards Real-Time Object Detection with Region Proposal Networks", Neural Information Processing Systems 28, Montreal, Quebec, Canada, Dec. 12, 2015, 9 pages.
Russakovsky et al., "ImageNet Large Scale Visual Recognition Challenge", International Journal of Computer Vision, vol. 115, Issue 3, Dec. 2015, pp. 211-252.
Simonyan et al., "Very Deep Convolutional Networks for Large-Scale Image Recognition", International Conference on Learning Representations, San Diego California, May 7-9, 2015, 14 pages.
Sivic et al., "Video Google: A Text Retrieval Approach to Object Matching in Videos", International Conference on Computer Vision, Nice, France, Oct. 13-16, 2003, pp. 1470-1477.
Tolias et al., "Particular Object Retrieval with Integral Max-Pooling of CNN Activations", International Conference on Learning Representations, San Juan, Puerto Rico, May 2-4, 2015, 12 pages.
Torii et al., "Visual Place Recognition with Repetitive Structures", Conference on Computer Vision and Pattern Recognition, Portland, Oregon, Jun. 23-28, 2013, pp. 883-890.
Uricchio et al., "Fisher Encoded Convolutional Bag-of-Windows for Efficient Image Retrieval and Social Image Tagging", International Conference on Computer Vision Workshops, Santiago, Chile, Dec. 11-18, 2015, pp. 1020-1026.
Verdie et al., "TILDE: A Temporally Invariant Learned DEtector", Conference on Computer Vision and Pattern Recognition, Boston, Massachusetts, Jun. 7-12, 2015, pp. 5279-5288.
Xu et al., "Show, Attend and Tell: Neural Image Caption Generation with Visual Attention", International Conference on Machine Learning, Lille, France, Jul. 6-11, 2015, pp. 2048-2057.
Yang, et al., "Stacked Attention Networks for Image Question Answering", Conference on Computer Vision and Pattern Recognition, Las Vegas, Nevada, Jun. 26-Jul. 1, 2016, pp. 21-29.
Yi et al., "LIFT: Learned Invariant Feature Transform", European Conference on Computer Vision, Amsterdam, The Netherlands, Oct. 8-16, 2016, pp. 467-483.
Yi et al., "Learning to Assign Orientations to Feature Points", Conference on Computer Vision and Pattern Recognition, Las Vegas, Nevada, Jun. 26-Jul. 1, 2016, pp. 107-116.
Zagoruyko et al., "Learning to Compare Image Patches via Convolutional Neural Networks", Conference on Computer Vision and Pattern Recognition, Boston, Massachusetts, Jun. 7-12, 2015, pp. 4353-4361.
Zheng et al., "SIFT Meets CNN: A Decade Survey of Instance Retrieval", Journal of Latex Class Files, vol. 14, No. 8, Aug. 2015, 20 pages.

(56) References Cited

OTHER PUBLICATIONS

Zheng et al., "Tour the World: Building a Web-Scale Landmark Recognition Engine", Conference on Computer Vision and Pattern Recognition, Miami, Florida, Jun. 20-26, 2009, 8 pages.
Zhou et al., "Learning Deep Features for Discriminative Localization", Conference on Computer Vision and Pattern Recognition, Las Vegas, Nevada, Jun. 26-Jul. 1, 2016, pp. 2921-2929.

* cited by examiner

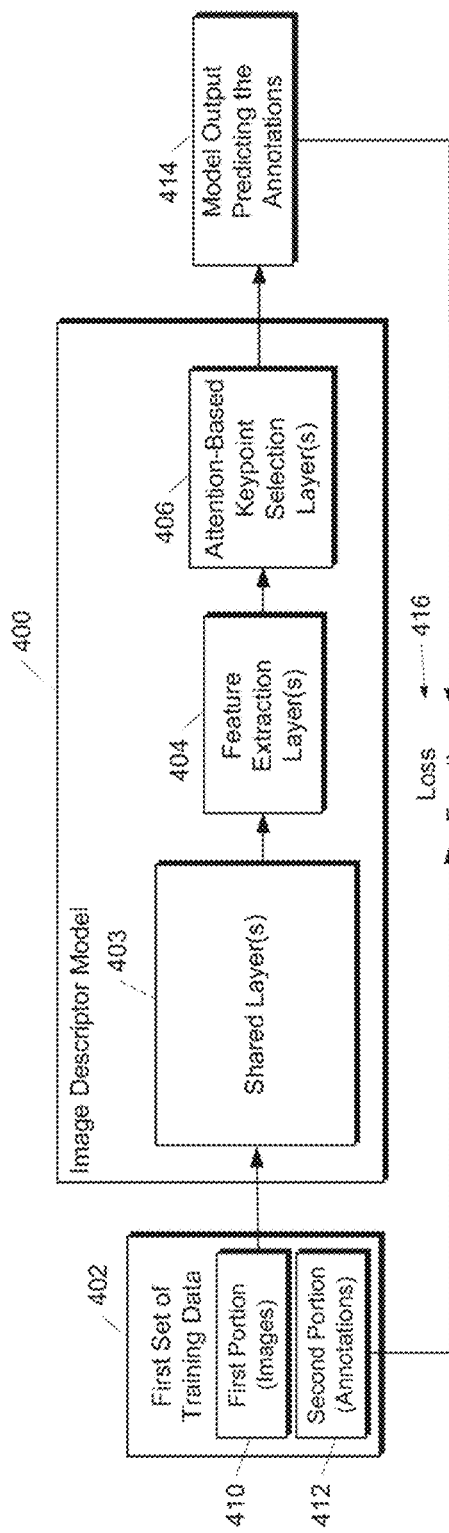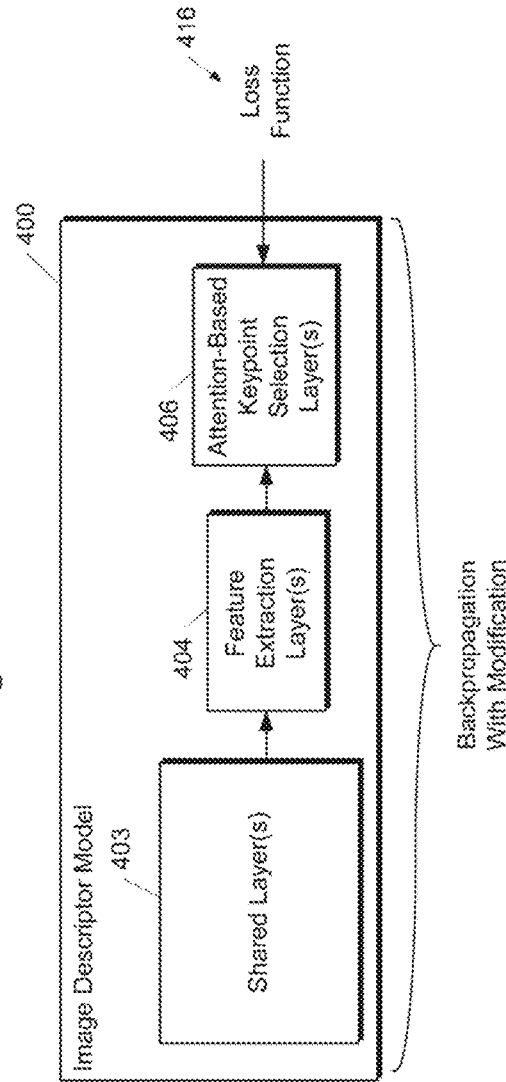
Figure 5
Figure 6

800

804 — Obtain a set of keypoint descriptors associated with a query image

804 — Access an index of keypoint descriptors associated with a plurality of database images 806 — Determine matching descriptors by analyzing the keypoint descriptors associated with the query image relative to the keypoint descriptors stored in the index (e.g., implement nearest neighbor searching)

808 — Geometrically verify matching features identified within a query image and one or more matching images 810 — Retrieve one or more matching images associated with the matching descriptors 812 — Provide the one or more matching images as output (e.g., provide the one or more matching images for display)

Figure 10

IMAGE RETRIEVAL WITH DEEP LOCAL FEATURE DESCRIPTORS AND ATTENTION-BASED KEYPOINT DESCRIPTORS

FIELD

The present disclosure relates generally to implementing machine learning for determining image descriptors. More particularly, the present disclosure relates to systems and methods for image retrieval using machine-learned image descriptor models for determining deep local feature descriptors and attention-based keypoint descriptors.

BACKGROUND

Large-scale image retrieval is a fundamental task in computer vision, since it is directly related to various practical applications, e.g., object detection, visual place recognition and product recognition. Conventional techniques often achieve limited recall when required to deliver retrieval results with high precision.

In particular, some conventional image retrieval systems rely on hand-crafted algorithms for determining image features and indexing algorithms. Such hand-crafted algorithms typically require an algorithm programmer to exhaustively derive heuristic models of how different descriptors should be generated for different images in different scenarios and/or for different applications. This process requires a substantial amount of research time, and is not always scalable to larger or different image datasets. In addition, hand-crafted algorithms often cannot leverage advances in image processing technology without developing entirely new sets of hand-crafted algorithms.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of image retrieval. The method includes receiving, by a computing system comprising one or more computing devices, a query image. The method also includes determining, by the computing system, a plurality of local feature descriptors from the query image. The method also includes determining, by the computing system, an attention score for each local feature descriptor. The method also includes determining, by the computing system, a set of keypoint descriptors for the query image based at least in part on the attention scores, the set of keypoint descriptors corresponding to a subset of the local feature descriptors. The method also includes reducing, by the computing system, a spatial dimensionality of the set of keypoint descriptors for the query image. The method also includes retrieving, by the computing system, one or more images corresponding to the query image, based at least in part on the set of keypoint descriptors for the query image.

Another example aspect of the present disclosure is directed to one or more tangible, non-transitory computer-readable media storing computer-readable instructions that when executed by one or more processors cause the one or more processors to perform operations. The operations include obtaining data descriptive of a machine-learned image descriptor model, wherein the machine-learned image descriptor model has been trained to receive one or more input images and, in response to receipt of the one or more input images, provide a set of keypoint descriptors, each keypoint descriptor describing a selected local feature determined from the one or more input images. The operations also include obtaining a query image. The operations also include inputting the query image into the machine-learned image descriptor model. The operations also include receiving, as an output of the machine-learned image descriptor model, a set of keypoint descriptors, each keypoint descriptor describing a selected local feature determined from the query image. The operations also include providing the set of keypoint descriptors as to an image processing application.

Another example aspect of the present disclosure is directed to an image retrieval system. The image retrieval system includes at least one processor. The image retrieval system also includes a machine-learned image descriptor model, the image descriptor model trained to receive an image and, in response to receipt of the image, output a set of keypoint descriptors, the set of keypoint descriptors having been selected as a subset of local feature descriptors based at least in part on scores determined by the machine-learned image descriptor model for the local feature descriptors. The image retrieval system also includes an index of keypoint descriptors determined by providing a plurality of database images as input to the machine-learned image descriptor model. The image retrieval system also includes at least one tangible, non-transitory computer-readable medium that stores instructions that, when executed by the at least one processor, cause the at least one processor to perform operations. The operations include: receiving a query image; inputting the query image into the machine-learned image descriptor model; receiving, as an output of the machine-learned image descriptor model, a set of keypoint descriptors associated with the query image; determining a set of matching features by comparing the keypoint descriptors associated with the query image with the index of keypoint descriptors; and retrieving at least one matching image based on the set of matching features.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a block diagram of a first aspect of an example model training technique according to example embodiments of the present disclosure;

FIG. 6 depicts a block diagram of a second aspect of an example model training technique according to example embodiments of the present disclosure;

FIG. 10 depicts a flow chart diagram of an example image retrieval method according to example embodiments of the present disclosure.

DETAILED DESCRIPTION

Figure 1:
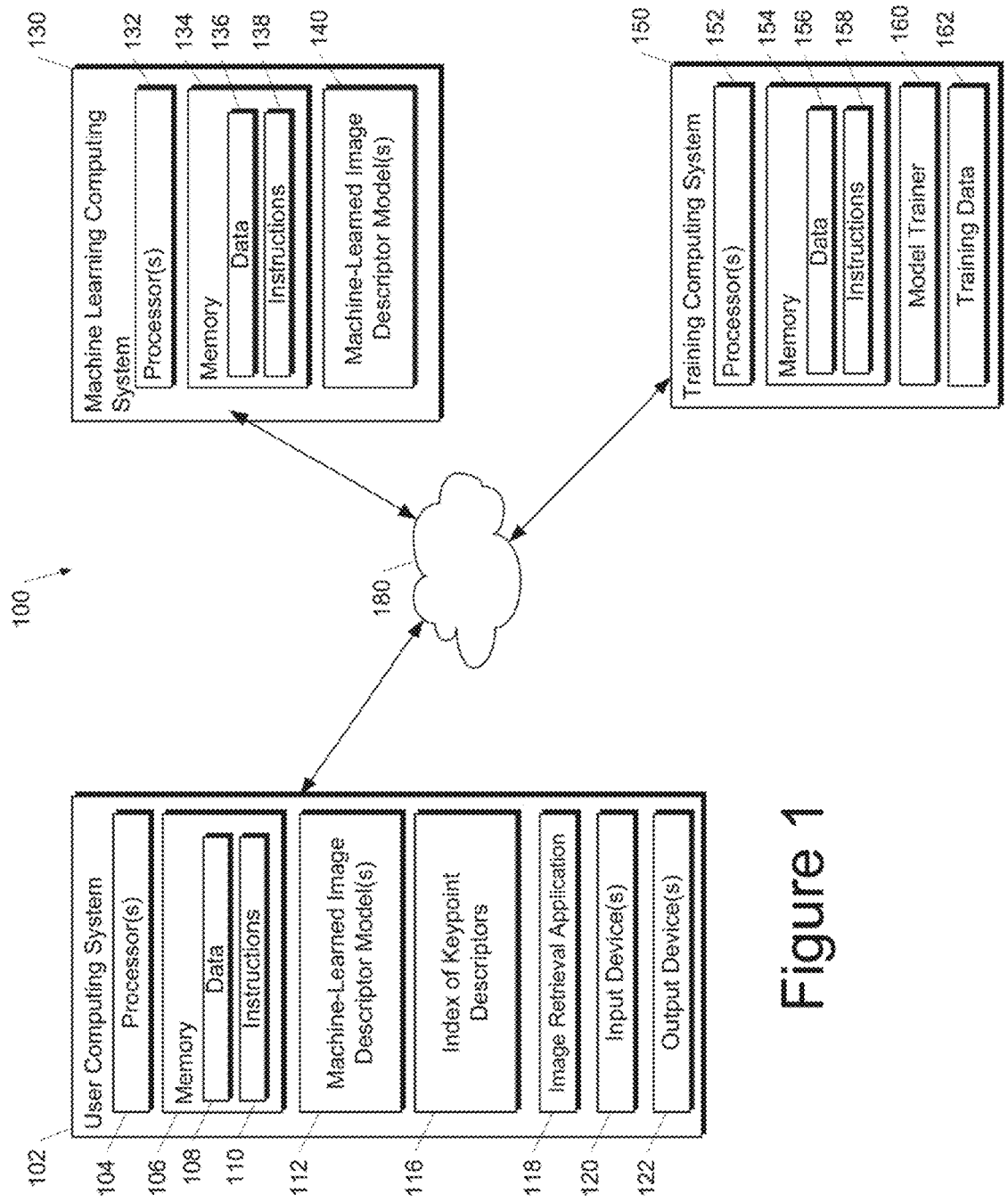
FIG. 1 depicts a block diagram of an example computing system according to example embodiments of the present disclosure.

Generally, the present disclosure is directed to systems and methods that leverage deep machine learning to determine attention-based image descriptors. Such machine-learned image descriptor models can be especially useful for image processing applications such as large-scale image retrieval applications. In particular, the systems and methods of the present disclosure can include and use a machine-learned image descriptor model that has been trained to receive an input image, and in response to receipt of the input image, output a set of keypoint descriptors, the set of keypoint descriptors having been selected as a subset of local descriptors based at least in part on scores determined by the machine-learned image descriptor model for the local descriptors. The trained image descriptor model can be used to analyze a plurality of database images to create a large-scale index of keypoint descriptors associated with the database images. One or more computing devices associated with an image retrieval application can provide a query image as input to the trained image descriptor model, resulting in receipt of a set of keypoint descriptors associated with the query image. Keypoint descriptors associated with the query image can be analyzed relative to the index to determine matching descriptors (e.g., by implementing a nearest neighbor search). Matching descriptors can then be geometrically verified and used to identify one or more matching images from the plurality of database images to retrieve and provide as output (e.g., by providing for display) within the image retrieval application. The disclosed image descriptor model using attention-based keypoint descriptors can be used as a drop-in replacement for other keypoint detectors and descriptors to provide more accurate feature matching and geometric verification. As a benefit of the determined keypoint descriptor(s), image retrieval and other image processing applications can have improved robustness, greater accuracy, and enhanced computational efficiency.

According to an aspect of the present disclosure, a computing system including one or more computing devices can obtain data descriptive of an image descriptor model. In some implementations, the image descriptor model is a machine-learned image descriptor model. The image descriptor model can have been trained to receive one or more input images and, in response to receipt of the one or more input images, provide a set of keypoint descriptors, each keypoint descriptor describing a selected local feature determined from the one or more input images. The computing system then can obtain a query image, and input the query image into the image descriptor model. The computing system can receive, as an output of the image descriptor model, a set of keypoint descriptors, each keypoint descriptor describing a selected local feature determined from the query image. The computing system can provide the set of keypoint descriptors for the query image to an image processing application (e.g., an image retrieval application).

According to an aspect of the present disclosure, the machine-learned image descriptor model can include a neural network, and inputting the query image can include inputting the query image into the neural network of the machine-learned image descriptor model. In some implementations, the image descriptor model can include a convolutional neural network. In some implementations, the image descriptor model can include a deep convolutional neural network. In some implementations, the machine-learned image descriptor model can include many different sizes, numbers of layers and levels of connectedness. For neural networks trained by large datasets, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters. In some implementations, the machine-learned image descriptor model can be additionally configured using one or more techniques including but not limited to embeddings, batch normalization, layer normalization, gradient clipping, attention mechanisms, adding REctified Linear UnitS (RELUS), leaky RELUS, etc.

According to an aspect of the present disclosure, the image descriptor model can be trained to implement feature extraction by determining a plurality of local feature descriptors for an image. Local feature descriptors can generally describe a portion of an image (e.g., a local feature) as opposed to the entirety of an image (e.g., a global feature). In some implementations, the plurality of local feature descriptors corresponds to a feature map formed as a dense grid of local feature descriptors. In some implementations, local feature descriptors are localized to identify their relative location within an image. In some implementations, local feature descriptors can be deep local feature descriptors by using machine-learned image descriptor models that employ deep neural networks.

According to another aspect of the present disclosure, a computing system can implement keypoint selection to determine a set of keypoint descriptors based at least in part on attention scores determined for the plurality of local feature descriptors. Attention scores can be descriptive of an assigned value for each local feature descriptor within the context of a given image processing application. For instance, within an image retrieval application, the image descriptor model can assign higher attention scores to local feature descriptors that are more likely to be relevant for retrieving matching images or other types of images or related information. The attention scores can then be used to determine a set of keypoint descriptors, namely a subset of the local feature descriptors having been assigned a predetermined level of attention score. In some implementations, the set of keypoint descriptors comprises a predetermined number of local feature descriptors having the highest attention scores for a given image. In some implementations, the predetermined level of attention score can correspond to a fixed threshold value, such that feature descriptors having an attention score higher than the fixed threshold value are selected as part of the set of keypoint descriptors. In some implementations, the predetermined level of attention score can correspond to a relative value, such that feature descriptors having a higher attention score than other feature descriptors within the same image are selected as part of the set of keypoint descriptors. In some implementations, the set of keypoint descriptors can be selected as a predetermined number of feature descriptors having the highest attention scores for a given image.

As such, an image descriptor model trained to generate a set of keypoint descriptors can include layers that are trained to extract local feature descriptors from an image, determine attention scores for the local feature descriptors, and ultimately determine a subset of the local feature descriptors having a highest score for inclusion in a set of keypoint descriptors. By determining a subset of semantically useful features, as opposed to all features within a dense grid, those local features that are less likely relevant to the given image application (e.g., image retrieval) can be removed. By removing the local features that are more likely to add clutter and/or distract an image application, keypoint selection can thus advantageously increase accuracy and computational efficiency for a variety of image applications.

According to an aspect of the present disclosure, the image descriptor model can implement both feature extraction (e.g., determining local feature descriptors) and keypoint selection (e.g., determining attention scores and using the attention scores to determine a set of keypoint descriptors) with a single forward pass of data through the image descriptor model. For instance, an image descriptor model can include a plurality of shared layers that are used at least in part both for determining the one or more local feature descriptors and for determining an attention score for each of the one or more local feature descriptors. By using a plurality of shared layers to implement at least part of both feature extraction and keypoint selection, the same machine-learned model architecture can be used to generate attention scores using very little extra computational resources.

In some implementations, the image descriptor model can localize the feature(s) described by the local descriptor(s), based at least in part on a receptive field associated with each feature. The receptive fields for each feature can be computed based at least in part on a configuration of one or more layers in the neural network of the image descriptor model. The image descriptor model can provide the localized feature descriptor(s) as an output of the image descriptor model.

According to another aspect of the present disclosure, a computing system can also implement dimensionality reduction to reduce a spatial dimensionality for a determined set of keypoint descriptors. Dimensionality reduction can be especially useful for image processing applications such as image retrieval, by selecting keypoint descriptors to obtain improved retrieval accuracy. Example dimensionality reduction techniques can include, for example, normalization (e.g., L1 or L2 normalization), principle component analysis (PCA), missing values ratios, low variance filters, high correlation filters, random forests, ensemble trees, backward feature elimination, forward feature construction, and other appropriate dimensionality reduction techniques. In some implementations, for example, at least first and second dimensionality reduction steps can be implemented. In some instances, the at least first and second dimensionality reduction steps can use similar techniques while in other instances, the at least first and second dimensionality reduction steps can use different techniques. In one particular example, implementation of L2 normalization can be followed by PCA implementation, followed by another round of L2 normalization.

According to another aspect of the present disclosure, a computing system can also construct an image pyramid including a plurality of image levels based at least in part on an input image (e.g., a query image, a plurality of database images, etc.). The computing system can then input each of the plurality of image levels into the image descriptor model, independently. By employing such an image pyramid, local features can be determined that describe image regions of different sizes thus accommodating scale changes across images. In some implementations, image pyramids can be constructed by using scales that are separated by a predetermined factor (e.g., $\sqrt{2}$). In some implementations, the image pyramid construction scale is inversely proportional to a receptive field associated with the machine-learned image descriptor model (e.g., a neural network).

According to another aspect of the present disclosure, a computing system can also generate an index including descriptors associated with a plurality of database images. The plurality of database images can be provided as input to the image descriptor model, and corresponding outputs received from the image descriptor model in response to the plurality of database images being provided as input can be used to create the index. The index can be stored in an accessible location to support subsequent querying used to rank database images based on geometrically verified matches to a query image. As part of generating the index, a computing system can obtain a plurality of database images, determine a plurality of local feature descriptors for each database image, and determine an attention score for the local feature descriptors associated with each database image. A set of keypoint descriptors for each database image can be determined based at least in part on the attention scores, the set of keypoint descriptors corresponding to a subset of the local feature descriptors for that database image. This set of keypoint descriptors for each database image can be stored in a dedicated memory storage device or location to generate the index.

According to another aspect of the present disclosure, an image retrieval system can include at least one processor and at least one tangible, non-transitory computer-readable medium that stores instructions that, when executed by the at least one processor, cause the at least one processor to perform operations. The image retrieval system can further include or otherwise access an image descriptor model as described herein. The image retrieval system can also include or otherwise access an index of keypoint descriptors generated by providing a plurality of database images as input to the image descriptor model and storing the model output. The image retrieval system can receive a query image, input the query image into the image descriptor model, and receive as an output of the image descriptor model, a set of keypoint descriptors associated with the query image. A set of zero or more matching descriptors can be determined by comparing the keypoint descriptors associated with the query image with the index of keypoint descriptors. In some implementations, determining a set of matching descriptors can include implementing a nearest neighbor search among keypoint descriptors associated with the query image and keypoint descriptors associated with the plurality of database images.

In some implementations, the image retrieval system can aggregate all the matching descriptor(s) for each of the plurality of database images, and perform geometric verification to identify and reject one or more false positive matching descriptor(s). The image retrieval system can determine one or more matching image(s) by identifying one or more images within the plurality of database images associated with the matching descriptor(s). The one or more matching images can be retrieved from the plurality of database images and provided as output. For instance, the computing system can provide the retrieved matching images for display on a display device associated with the computing system. The image retrieval system can create a local or remote copy of the matching image(s), obtain URL(s) for the matching image(s), generate thumbnail(s) of the matching image(s), and/or provide any other indication(s) or representation(s) of the matching image(s).

According to another aspect of the present disclosure, the image descriptor model described herein can be trained on ground-truth data using one or more novel loss functions. More particularly, a training computing system can train the image descriptor model using a training dataset that includes a number of sets of ground-truth data. In one implementation, the training data includes a first portion of training data corresponding to a plurality of training images and a second portion of training data corresponding to image-level labels/annotations associated with the plurality of training images. The image-level labels can be manually determined, automatically determined, or determined using a combination of automatic and manual techniques.

In some implementations, the plurality of training images can be captured at various different geographic locations, and an image-level label associated with each training image can be associated with a corresponding geographic position label (e.g., a set of GPS coordinates, an address, latitude/longitude/altitude values, or other suitable identifier(s) of geographic position).

In some implementations, the plurality of training images can include a large-scale landmark image dataset (e.g., a landmark dataset). In some implementations, the landmark dataset can include landmark-centric images, as well as more realistic images with variations including foreground/background clutter, occlusion, partially out-of-view objects, etc. For training images including landmarks, image-level labels associated with each training image can include zero or more visual feature labels identifying any landmarks or other visual features included within each training image.

In some implementations, the plurality of training images can include one or more training images that do not contain any landmarks or other visual features. Such training images without visual features and corresponding labels can be referred to as distractors. An image descriptor model can be trained to output a set of keypoint descriptors for each such image that would ultimately result in an image retrieval system retrieving zero images as matching images. By including training images that do not contain any visual features, the image descriptor models can be more adequately trained to robustly operate against queries that have no correct match within a plurality of database images.

In some implementations, to train the image descriptor model, a training computing system can input a first portion of a set of ground-truth data (e.g., the first portion of the training dataset corresponding to a plurality of training images) into the image descriptor model to be trained. In response to receipt of each training image in such first portion of the training dataset, the image descriptor model generates an output. This output of the image descriptor model predicts the remainder of the set of ground-truth data (e.g., the second portion of data associated with each training image). After such prediction, the training computing system can apply or otherwise determine a loss function that compares the output of the image descriptor model to the remainder of the ground-truth data which the image descriptor model attempted to predict. The training computing system then can backpropagate the loss function through the image descriptor model to train the image descriptor model (e.g, by modifying one or more weights associated with the image descriptor model). This process of inputting ground-truth data, determining a loss function and backpropagating the loss function through the image descriptor model can be repeated numerous times as part of training the image descriptor model.

In some implementations, to train the image descriptor model, a training computing system can implement a two-part training procedure. For instance, the training computing system can train an image descriptor based on a first training process to learn determination of the one or more local feature descriptors and a second training process to learn determination of the attention scores for each of the one or more local feature descriptors given the determined local feature descriptors. In some implementations, the first training process can determine a first loss function that can be backpropagated through the image descriptor model to train the feature extraction layers in the image descriptor model (e.g, by modifying one or more weights associated with the feature descriptor layers within the image descriptor model). In some implementations, the second training process can determine a second loss function that can be backpropagated through the image descriptor model to train the attention-based keypoint selection layers in the image descriptor model (e.g, by modifying one or more weights associated with the attention-based keypoint selection layers within the image descriptor model).

In some implementations, the first loss function is a cross-entropy loss function. In some implementations, the plurality of training images used to determine the first and second loss functions are center-cropped and randomly rescaled during the second training process for learning determination of attention scores and keypoint selection. Random rescaling of the training images can help to advantageously train the image descriptor model to generate effective scores for features at different scales.

The systems and methods described herein may provide a number of technical effects and benefits. For instance, the disclosed techniques enable a framework for image retrieval that can be used as a drop-in replacement for other keypoint detectors and descriptors, enabling more accurate feature matching and geometric verification. The resulting image descriptor models can thus be advantageously used as part of a variety of image processing applications, including for example, image retrieval applications, object detection applications, visual place recognition applications, product recognition applications, landmark recognition applications, logo recognition applications, and others. The inclusion of keypoint selection can be especially useful for both accuracy and computational efficiency in image retrieval applications since a substantial part of the extracted features from an input image are irrelevant to an image recognition and retrieval task. Otherwise, the extracted features that are irrelevant are likely to add clutter, distracting the image retrieval process.

Another example technical effect and benefit of the present disclosure can be achieved through the use of shared layers within an image descriptor model that are used at least in part for both determining the one or more local feature descriptors and for determining an attention score for each of the one or more local feature descriptors. Such joint implementation can result in much faster processing times compared with alternative systems that use sequential processing steps for determining features and keypoints. In addition, shared layers that simultaneously determine feature descriptor(s) and attention scores can advantageously protect against generating an incorrect final output if a mistake is made during one of the earlier processing steps. This error dependency can be a potential problem in systems that implement end-to-end processing. By using at least some of the same neural network architecture, both feature extraction and keypoint selection can be implemented using one forward pass over the neural network, thus providing noticeable improvements in computational efficiency of the image descriptor model.

In addition, implementing keypoint selection after feature extraction within the image descriptor model helps to repeatably determine keypoint descriptors under different imaging conditions while also effectively discriminating different feature instances appropriate for image processing applications such as image classification and image retrieval. As a result, an improved image descriptor model including feature extraction and keypoint selection can provide more accurate predictions across a robust framework of query images.

Another example technical effect and benefit of the present disclosure is afforded through image descriptor models that are trained using a large-scale training dataset, comprising more comprehensive and challenging conditions to improve algorithm performance and evaluation methodology by deriving more statistically meaningful results. As a result of training the image descriptor model with such a training dataset, local descriptors implicitly learn representations that are more relevant for image retrieval. In this manner, neither object-level nor patch-level annotations are necessary, and the image descriptor model can obtain improved local feature descriptors with only image-level annotations in the training dataset.

Another example technical benefit of the present disclosure is improved scalability. In particular, modeling image descriptors through neural networks or other machine-learned models greatly reduces the research time needed relative to development of hand-crafted image descriptor algorithms. For example, for hand-crafted image descriptor algorithms, an algorithm programmer would need to exhaustively derive heuristic models of how different descriptors should be generated for different images in different scenarios and/or for different applications. By contrast, to use neural networks or other machine learning techniques as described herein, a machine-learned image descriptor model can be trained on appropriate training data, which can be done at a massive scale if the training system permits. In addition, the machine-learned models can easily be revised as new training data is made available.

With reference now to the Figures, example embodiments of the present disclosure will be discussed in further detail.

FIG. 1 depicts a block diagram of an example computing system 100 according to example embodiments of the present disclosure. Computing system 100 can include, for example, one or more of a user computing system 102, machine learning computing system 130, and training computing system 150, which can be respectively configured or operable to perform aspects of the present disclosure, including creation and/or use of an image descriptor model and/or image retrieval application. User computing system 102, machine learning computing system 130, and training computing system 150 can be communicatively connected over a network 180. Although only one user computing system 102 is shown, any number of user computing systems 102 can be connected to the machine learning computing system 130 and/or training computing system 150 over the network 180.

More particularly, the user computing system 102 can include one or more computing devices, such as but not limited to a desktop computing device, a laptop computing device, a tablet computing device, a mobile computing device (e.g., a smartphone computing device), a computing device of a vehicle (e.g., an in-vehicle communications system, an in-vehicle entertainment system, an in-vehicle navigation system), or a wearable apparatus that includes a computing device (e.g., a watch having a computing device, glasses having a computing device, a virtual or augmented reality computing device). Additional and/or alternative computing devices can be provided.

The user computing system 102 can include one or more processors 104 and a memory 106. The one or more processors 104 can be any suitable processing device (e.g., a processor core, a microprocessor, an ASIC, a FPGA, a GPU, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the one or more processors 104 to cause the user computing system 102 to perform operations.

Figure 2:
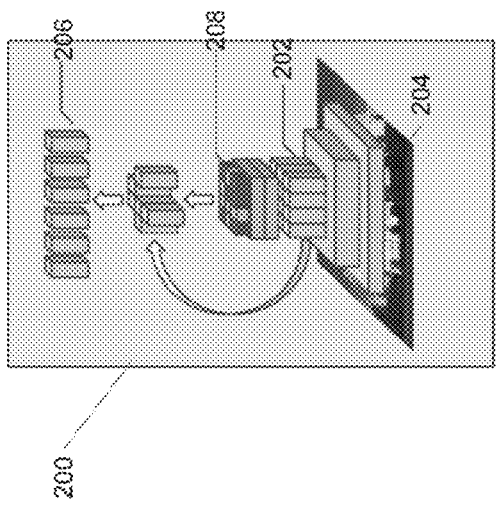
FIG. 2 depicts a first block diagram of an example image descriptor model according to example embodiments of the present disclosure.

The user computing system 102 can store or otherwise include an image descriptor model 112. Image descriptor model 112 can be or can otherwise include a machine-learned image descriptor model. For example, a machine-learned image descriptor model can include one or more neural networks (e.g., deep neural networks), support vector machines, decision trees, ensemble models, k-nearest neighbors models, Bayesian networks, or other types of multi-layer models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks. In some implementations, the user computing system 102 can additionally or alternatively access an image descriptor model that is stored in a remote location from the user computing system 102 (e.g., at a remote server location hosting an image descriptor or image retrieval application), such as machine learning computing system 130. FIG. 2 includes some additional aspects associated with an image descriptor model 112.

User computing system 102 can further include an index 116 that includes image descriptors associated with a plurality of database images. A plurality of database images can be provided as input to the image descriptor model 112, and corresponding outputs received from the image descriptor model 112 in response to the plurality of database images being provided as input can be used to create the index 116. The index 116 can be stored in an accessible location within user computing system 102 or other computing system to support subsequent querying, such as by image retrieval application 118. As part of generating the index 116, user computing system 102, machine learning computing system 130 and/or training computing system 150 can obtain a plurality of database images, determine a plurality of local feature descriptors for each database image, and determine an attention score for the local feature descriptors associated with each database image. A set of keypoint descriptors for each database image can be determined based at least in part on the attention scores, the set of keypoint descriptors corresponding to a subset of the local feature descriptors for that database image. This set of keypoint descriptors for each database image can be stored in a dedicated memory storage device or location to generate the index 116. Additional details regarding operations associated with generating index 116 are described with reference to FIG. 8.

User computing system 102 can further include an image retrieval application 118. When user computing system 102 executes the instructions stored within image retrieval application 118, user computing system 102 can be configured to function as an image retrieval system. More particularly, image retrieval application 118 can include instructions that, when executed by the at least one processor 104, cause the at least one processor to perform various image retrieval operations. Additional details regarding image retrieval operations are described with reference to FIGS. 7 and 9.

The user computing system 102 can further include one or more input devices 120. In some implementations, the one or more input devices 120 can additionally or alternatively be available via electronic devices of a user that are networked with the user computing system 102 (e.g., input devices within a wearable computing device associated with a user that is in electronic communication with user computing system 102 also associated with the user). Example input devices can include, for example, a touch screen, a touch pad, data entry keys, a mouse, a camera, a microphone suitable for voice recognition, and/or any other suitable device. In some examples, one or more input devices 120 can be used to capture or otherwise identify one or more query images for processing by image retrieval application 118. In some implementations, device data obtained from input device(s) 120 can be stored as part of data 108 within user computing system 102. It should be appreciated that a user of user computing system 102 can be provided with an opportunity to control whether and/or which device data is obtained and accessible to image descriptor model 112 and/or other components of user computing system 102 and related applications or models.

The user computing system 102 can further include one or more output devices 122. In some implementations, the one or more output devices 122 can additionally or alternatively be available via electronic devices of a user that are networked with the user computing system 102 (e.g., output devices within a wearable computing device associated with a user that is in electronic communication with user computing system 102 also associated with the user). Example output devices can include, for example, a display device, speakers, a storage device, and/or any other suitable device. In some examples, one or more output devices 122 can be used to provide retrieved images, related data or other information determined in accordance with the disclosed image descriptor and/or image retrieval techniques. In some implementations, an output device 122 can include a display screen configured with a touch-sensitive surface such that a user of user computing system 102 can interact with a graphical user interface provided on the display screen, thus providing a component for receiving signal instructions from a user of the user computing system 102.

The machine learning computing system 130 can include one or more processors 132 and a memory 134. The one or more processors 132 can be any suitable processing device (e.g., a processor core, a microprocessor, an ASIC, a FPGA, a GPU, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the one or more processors 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof The machine learning computing system 130 can store or otherwise include one or more machine-learned models, including machine-learned image descriptor model 140. For example, the machine-learned image descriptor model 140 can be or can otherwise include various machine-learned models such as neural networks (e.g., deep recurrent neural networks) or other multi-layer non-linear models, regression-based models or the like. The machine learning computing system 130 can train the machine-learned image descriptor model 140 via interaction with the training computing system 150 that is communicatively coupled over the network 180. The training computing system 150 can be separate from the machine learning computing system 130 or can be a portion of the machine learning computing system 130. Once the machine-learned image descriptor model 140 is trained, it can be provided to or otherwise accessed by user computing system 102.

The training computing system 150 can include one or more processors 152 and a memory 154. The one or more processors 152 can be any suitable processing device (e.g., a processor core, a microprocessor, an ASIC, a FPGA, a GPU, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the one or more processors 152 to cause the training computing system 150 to perform operations. In some implementations, the training computing system 150 includes or is otherwise implemented by one or more server computing devices.

The training computing system 150 can include a model trainer 160 that trains the machine-learned image descriptor model 140. More particularly, the model trainer 160 can train image descriptor model 140 to receive one or more input images and, in response to receipt of the one or more input images, provide a set of keypoint descriptors as output, each keypoint descriptor describing a selected local feature determined from the one or more input images.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

Model trainer 160 can train the machine-learned image descriptor model 140 using training data 162. The training computing system 150 can implement model training using various training or learning techniques, such as, for example, backpropagation of one or more loss functions. Adapting weights within a machine-learned model via backpropagation can then be repeated in accordance with one or more algorithms including but not limited to Gradient Descent, Stochastic Gradient Descent (SGD), Adaptive Gradient Descent (AdaGrad) and/or Adaptive Moment Estimation (ADAM) algorithms. The model trainer 160 can perform a number of generalization techniques (e.g., weight decays, dropouts, etc.) to improve the generalization capability of the models being trained.

In particular, the model trainer 160 can train machine-learned image descriptor model 140 based on a set of training data 162. The training data 162 can include ground-truth data used to train machine-learned image descriptor model 140 using novel loss functions. More particularly, training computing system 150 can train machine-learned image descriptor model 140 using training data 162 that includes a number of sets of ground-truth data. In one implementation, the training data 162 includes a first portion of training data corresponding to a plurality of training images and a second portion of training data corresponding to image-level labels/annotations associated with the plurality of training images.

Model trainer 160 can train the machine-learned image descriptor model 140 using one or more loss functions that describe a difference between annotated labels associated with a set of ground-truth data and output data received from the machine-learned image descriptor model 140. In particular, in some implementations, such loss function(s) can be backpropagated through the machine-learned image descriptor model 140 while modifying the machine-learned image descriptor model 140 (e.g., by modifying at least one weight of the machine-learned image descriptor model 140). In some implementations, model trainer 160 can jointly train both feature extraction and attention-based keypoint selection portions of machine-learned image descriptor model 140. In other implementations, model trainer 160 can implement a two-part training process that first trains a feature extraction portion of machine-learned image descriptor model 140 and then trains an attention-based keypoint selection portion of machine-learned image descriptor model 140. Additional details regarding training of image descriptor model 112 and/or machine-learned image descriptor model 140 by model trainer 160 included as part of training computing system 150, machine learning computing system 130, user computing system 102 or other suitable training systems are described with reference to FIGS. 5, 6, and 11.

The network 180 can be any type of communications network, such as a local area network (e.g., intranet), wide area network (e.g., Internet), or some combination thereof and can include any number of wired or wireless links. In general, communication over the network 166 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2 depicts a first block diagram of an example image descriptor model 200 according to example embodiments of the present disclosure. In some implementations, features described with reference to image descriptor model 200 can be considered to apply to image descriptor model 112 or machine-learned image descriptor model 140 of FIG. 1. Image descriptor model 200 can be trained to implement feature extraction by determining a plurality of local feature descriptors 202 for an image 204. Local feature descriptors 202 can generally describe a portion of an image 204 (e.g., a local feature) as opposed to the entirety of an image 204 (e.g., a global feature). In some implementations, the plurality of local feature descriptors 202 corresponds to a feature map formed as a dense grid of local feature descriptors.

Referring still to FIG. 2, image descriptor model 200 can also implement keypoint selection to determine a set of keypoint descriptors 206 based at least in part on attention scores 208 determined for the plurality of local feature descriptors 202. Attention scores 208 can be descriptive of an assigned value for each local feature descriptor 202 within the context of a given image processing application. For instance, within an image retrieval application, the image descriptor model 200 can assign higher attention scores 208 to local feature descriptors 202 that are more likely to be relevant for retrieving matching images or other types of images or related information. The attention scores 208 can then be used to determine a set of keypoint descriptors 206, namely a subset of the local feature descriptors 202 having been assigned a predetermined level of attention score. In some implementations, the set of keypoint descriptors 206 comprises a predetermined number of local feature descriptors 202 having the highest attention scores 208 for a given image 204. In some implementations, the predetermined level of attention score can correspond to a fixed threshold value, such that feature descriptors 202 having an attention score 208 higher than the fixed threshold value are selected as part of the set of keypoint descriptors 206. In some implementations, the predetermined level of attention score can correspond to a relative value, such that local feature descriptors 202 having a higher attention score 208 than other feature descriptors within the same image 204 are selected as part of the set of keypoint descriptors 206. In some implementations, the set of keypoint descriptors 206 can be selected as a predetermined number of local feature descriptors 202 having the highest attention scores 208 for a given image 204.

In some implementations, local feature descriptors 202 are localized to identify their relative location within image 204. In some implementations, local feature descriptors 202 can be deep local feature descriptors by using machine-learned image descriptor models that employ deep neural networks. Image descriptor model 200 can localize the feature(s) described by the local feature descriptor(s) 202, based at least in part on a receptive field associated with each local feature descriptor 202. The receptive fields for each local feature descriptor 202 can be computed based at least in part on a configuration of one or more layers in a neural network of the image descriptor model 200. The image descriptor model 200 can thus provide a set of keypoint descriptors 206 that are localized relative to an original input image 204.

As such, image descriptor model 200 can be trained to extract local feature descriptors 202 from an image 204, determine attention scores 208 for the local feature descriptors 202, and ultimately determine a subset of the local feature descriptors having a highest score for inclusion in a set of keypoint descriptors 206. By determining a subset of semantically useful features, as opposed to all features within a dense grid, those local features that are less likely relevant to the given image application (e.g., image retrieval) can be removed. By removing the local features that are more likely to add clutter and/or distract an image application, keypoint selection can thus advantageously increase accuracy and computational efficiency for a variety of image applications.

Figure 3:
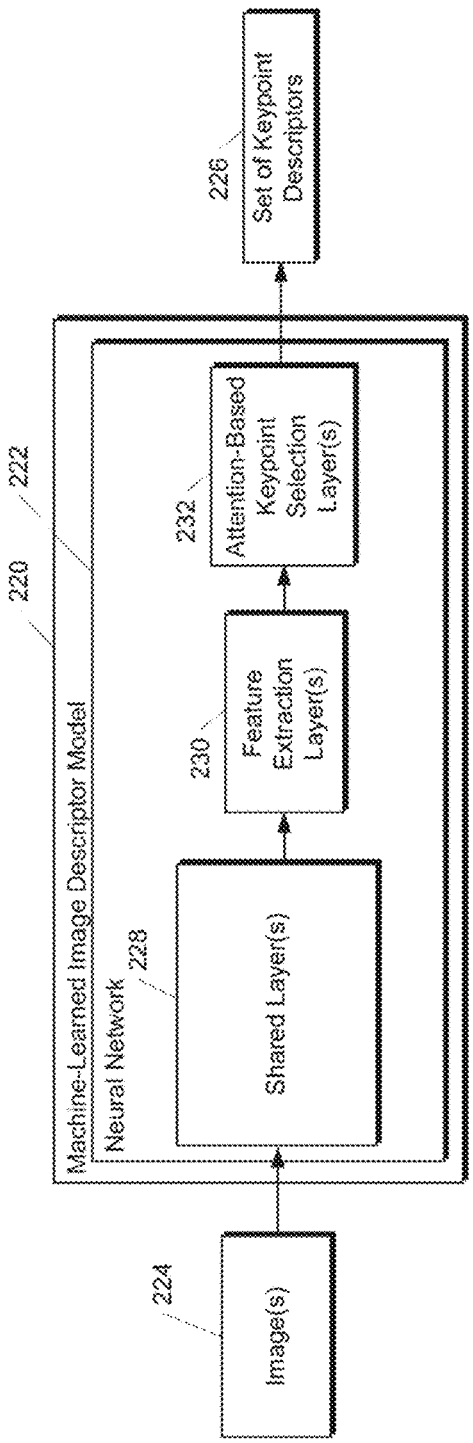
FIG. 3 depicts a second block diagram of an example image descriptor model according to example embodiments of the present disclosure.

FIG. 3 depicts a second block diagram of an example machine-learned image descriptor model 220 according to example embodiments of the present disclosure. In some implementations, features described with reference to machine-learned image descriptor model 220 can be considered to apply to image descriptor model 112 of FIG. 1, machine-learned image descriptor model 140 of FIG. 1, and/or image descriptor model 200 of FIG. 2.

According to an aspect of the present disclosure, the machine-learned image descriptor model 220 can include a neural network 222, and inputting an image 224 (e.g., a query image) can include inputting the image 224 into the neural network 222 of the machine-learned image descriptor model 220. Receiving a set of keypoint descriptors 226 as an output of machine-learned image descriptor model 220 can include receiving a set of keypoint descriptors 226 as an output of neural network 222 in response to receipt of image 224.

In some implementations, the neural network 222 of machine-learned image descriptor model 220 can include a convolutional neural network. In some implementations, the neural network 222 of machine-learned image descriptor model 220 can include a deep convolutional neural network. In some implementations, the neural network 222 of machine-learned image descriptor model 220 can include many different sizes, numbers of layers and levels of connectedness. When neural network 222 is trained by large datasets, the number of layers and layer size can be increased by using dropout to address the potential problem of overfitting. In some instances, neural network 222 can be designed to forego the use of fully connected upper layers at the top of the network. By forcing neural network 222 to go through dimensionality reduction in middle layers, machine-learned image descriptor model 220 including neural network 222 can be designed to be quite deep, while dramatically reducing the number of learned parameters. In some implementations, the neural network 222 of machine-learned image descriptor model 220 can be additionally configured using one or more techniques including but not limited to embeddings, batch normalization, layer normalization, gradient clipping, attention mechanisms, adding REctified Linear UnitS (RELUS), leaky RELUS, etc.

According to an aspect of the present disclosure, machine-learned image descriptor model 220 can implement both feature extraction (e.g., determining local feature descriptors) and keypoint selection (e.g., determining attention scores and using the attention scores to determine a set of keypoint descriptors) with a single forward pass of data through the machine-learned image descriptor model 220. For instance, machine-learned image descriptor model 220 can include a plurality of shared layers 228 that are used at least in part both for determining the one or more local feature descriptors and for determining an attention score for each of the one or more local feature descriptors. Machine-learned image descriptor model 220 can also include other layers than shared layers 228. For example, image descriptor model can include one or more feature extraction layers 230 used for feature extraction followed structurally by one or more attention-based keypoint selection layers 232 used to determine attention scores and select feature descriptors for inclusion in a set of keypoint descriptors. By using a plurality of shared layers 228 to implement at least part of both feature extraction and keypoint selection, the same machine-learned model architecture can be used to generate attention scores using very little extra computational resources.

Figure 4:
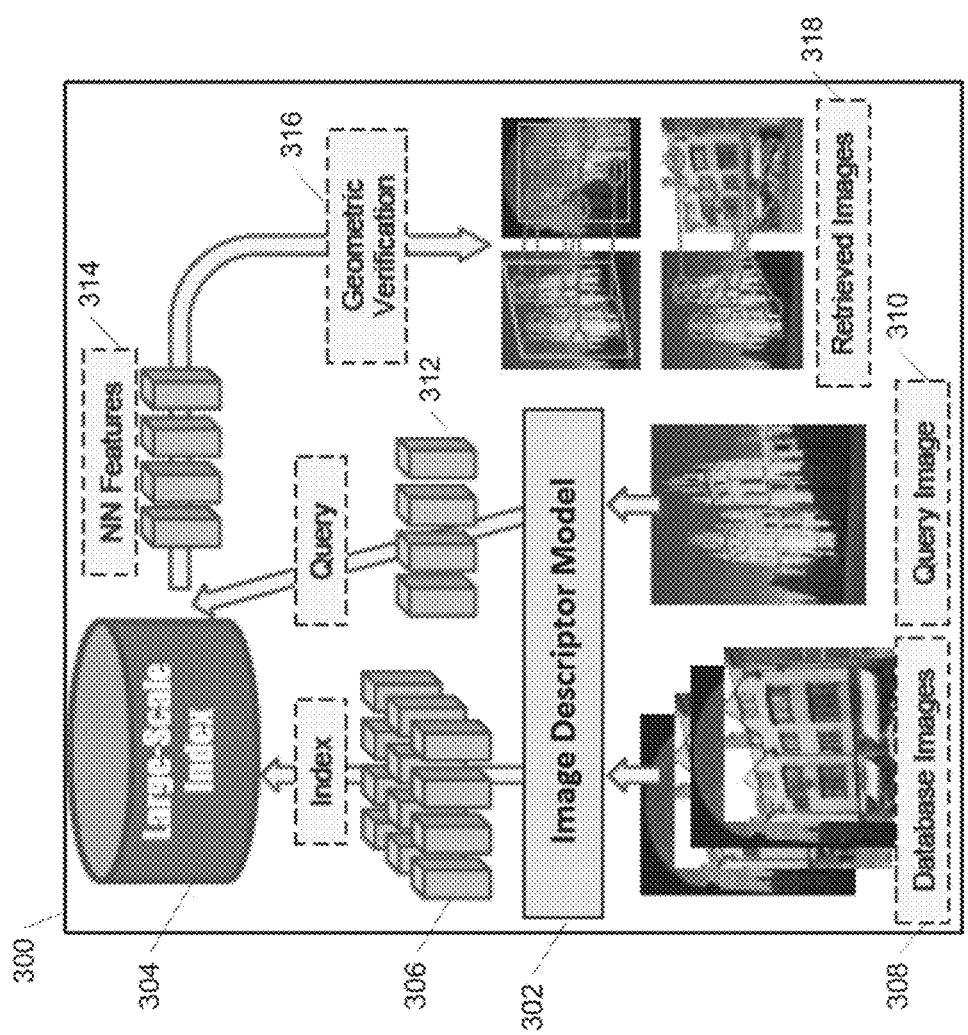
FIG. 4 depicts a block diagram of an example image retrieval system including an image descriptor model according to example embodiments of the present disclosure.

FIG. 4 depicts a block diagram of an example image retrieval system 300 including an image descriptor model 302 according to example embodiments of the present disclosure. Image descriptor model 302 can correspond, for example, to any of image descriptor model 112 or 140 of FIG. 1, image descriptor model 200 of FIG. 2, or machine-learned image descriptor model 220 of FIG. 3.

According to an aspect of image retrieval system 300, image descriptor model 302 can be used to generate an index 304 including keypoint descriptors 306 associated with a plurality of database images 308. The plurality of database images 308 can be provided as input to the image descriptor model 302, and corresponding outputs received from the image descriptor model 302 in response to the plurality of database images 308 being provided as input can be used to create the index 304. The index 304 can be stored in an accessible location to support subsequent querying used to rank database images based on geometrically verified matches to a query image 310. As part of generating the index 304, a computing system can obtain a plurality of database images 308, determine a plurality of local feature descriptors for each database image 308, and determine an attention score for the local feature descriptors associated with each database image 308. A set of keypoint descriptors 306 for each database image 308 can be determined based at least in part on the attention scores, the set of keypoint descriptors 306 corresponding to a subset of the local feature descriptors for that database image 308. This set of keypoint descriptors 306 for each database image 308 can be stored in a dedicated memory storage device or location to generate the index 304.

Referring still to FIG. 4, image retrieval system 300 can receive a query image 310, input the query image 310 into the image descriptor model 302, and receive as an output of the image descriptor model 302, a set of keypoint descriptors 312 associated with the query image 310. A set of zero or more matching descriptors 314 can be determined by analyzing the keypoint descriptors 312 associated with the query image 310 with the index 304 of keypoint descriptors 306. In some implementations, determining a set of matching descriptors 314 can include implementing a nearest neighbor search among keypoint descriptors 312 associated with the query image 310 and keypoint descriptors 306 associated with the plurality of database images 308.

In some implementations, the image retrieval system 300 can aggregate all the matching descriptor(s) 314 for each of the plurality of database images, and perform geometric verification 316 to identify and reject any false positive matching descriptor(s) included within the set of matching descriptors 314. The image retrieval system 300 can determine one or more matching image(s) 318 by identifying one or more images within the plurality of database images 308 associated with the matching descriptor(s) 314. The one or more matching images 318 can be retrieved from the plurality of database images 308 and provided as output. For instance, image retrieval system 300 can provide the retrieved matching images 318 for display on a display device associated with the computing system functioning as image retrieval system 300. The image retrieval system 300 can create a local or remote copy of the matching image(s) 318, obtain URL(s) for the matching image(s) 318, generate thumbnail(s) of the matching image(s) 318, and/or provide any other indication(s) or representation(s) of the matching image(s) 318.

According to another aspect of the present disclosure, an image descriptor model as described herein can be trained on ground-truth data using one or more novel loss functions. Referring more particularly to FIG. 5, a training computing system (e.g., training computing system 150 of FIG. 1) can train image descriptor model 400 using a set of training data 402 that includes a number of sets of ground-truth data. Image descriptor model 400 can correspond, for example, to any of image descriptor model 112 or 140 of FIG. 1, image descriptor model 200 of FIG. 2, machine-learned image descriptor model 220 of FIG. 3, or image descriptor model 302 of FIG. 4. As described relative to FIG. 3, image descriptor model 400 can include a plurality of shared layers 403 (corresponding, for example, to shared layers 228), one or more feature extraction layers 404 (corresponding, for example, to feature extraction layer(s) 230) and one or more attention-based keypoint selection layer(s) 406 (corresponding, for example, to attention-based keypoint selection layer(s) 232).

Referring still to FIG. 5, training data 402 can include a first portion 410 of training data 402 corresponding to a plurality of training images and a second portion 412 of training data 402 corresponding to image-level labels/annotations associated with the plurality of training images included within first portion 410 of training data 402. The image-level labels within second portion 412 of training data 402 can be manually determined, automatically determined, or determined using a combination of automatic and manual techniques.

In some implementations, the plurality of training images within first portion 410 of training data 402 can be captured at various different geographic locations, and an image-level label included in second portion 412 of training data 402 associated with each training image in first portion 410 of training data 402 can be associated with a corresponding geographic position label (e.g., a set of GPS coordinates, an address, latitude/longitude/altitude values, or other suitable identifier(s) of geographic position).

In some implementations, the plurality of training images included within first portion 410 of training data 402 can include a large-scale landmark image dataset (e.g., a landmark dataset). In some implementations, the landmark dataset can include landmark-centric images, as well as more realistic images with variations including foreground/background clutter, occlusion, partially out-of-view objects, etc. For training images including landmarks, image-level labels included within second portion 412 of training data 402 associated with each training image can include zero or more visual feature labels identifying any landmarks or other visual features included within each training image.

In some implementations, the plurality of training images included within first portion 410 of training data 402 can include one or more training images that do not contain any landmarks or other visual features. Such training images without visual features and corresponding labels can be referred to as distractors. Image descriptor model 400 can be trained to output a set of keypoint descriptors for each such image that would ultimately result in an image retrieval system retrieving zero images as matching images. By including training images that do not contain any visual features, the image descriptor models can be more adequately trained to robustly operate against queries that have no correct match within a plurality of database images.

In some implementations, to train the image descriptor model 400, a training computing system (e.g., training computing system 150 of FIG. 1) can input a first portion of a set of ground-truth data (e.g., the first portion 410 of the training data 402 corresponding to a plurality of training images) into the image descriptor model 400 to be trained. In response to receipt of each training image in such first portion 410 of the training data 402, the image descriptor model 400 generates an output 414. This output 414 of the image descriptor model 400 predicts the remainder of the set of ground-truth data (e.g., the second portion 412 of training data 402 associated with each training image in the first portion 410 of training data 402). After such prediction, the training computing system can apply or otherwise determine a loss function 416 that compares the output 414 of the image descriptor model 400 to the remainder of the ground-truth data (e.g., the second portion 412 of training data 402) which the image descriptor model 400 attempted to predict.

Referring now to FIG. 6, the training computing system then can backpropagate the loss function 416 through the image descriptor model 400 to train the image descriptor model 400 (e.g, by modifying one or more weights associated with the image descriptor model 400). This process of inputting ground-truth data, determining a loss function 416 and backpropagating the loss function 416 through the image descriptor model 400 can be repeated numerous times as part of training the image descriptor model 400.

In some implementations, to train the image descriptor model 400, a training computing system can implement a two-part training procedure. For instance, the training computing system can train an image descriptor model 400 based on a first training process to learn determination of the one or more local feature descriptors and a second training process to learn determination of the attention scores for each of the one or more local feature descriptors given the determined local feature descriptors. In some implementations, the first training process can include determining a first loss function that can be backpropagated through the image descriptor model 400 to train the feature extraction layers (e.g., selected shared layers 403 and the one or more feature extraction layers 404) in the image descriptor model 400 (e.g, by modifying one or more weights associated with the feature extraction layers within the image descriptor model 400). In some implementations, the second training process can determine a second loss function that can be backpropagated through the image descriptor model 400 to train the attention-based keypoint selection layers (e.g., selected shared layers 403 and the one or more attention-based keypoint selection layers 406) in the image descriptor model 400 (e.g, by modifying one or more weights associated with the attention-based keypoint selection layers within the image descriptor model 400).

In some implementations of a two-part training process, the first loss function can be a cross-entropy loss function. In some implementations, the plurality of training images used to determine the first and second loss functions can be center-cropped and randomly rescaled during the second training process for learning determination of attention scores and keypoint selection. Random rescaling of the training images within first portion 410 of training data 402 can help to advantageously train the image descriptor model 400 to generate effective scores for features at different scales.

Figure 7A:
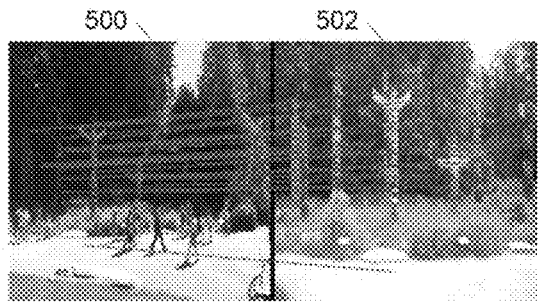
FIGS. 7a-7f depict respective examples of an input image and retrieved image using an image retrieval system according to example embodiments of the present disclosure.
Figure 7D:
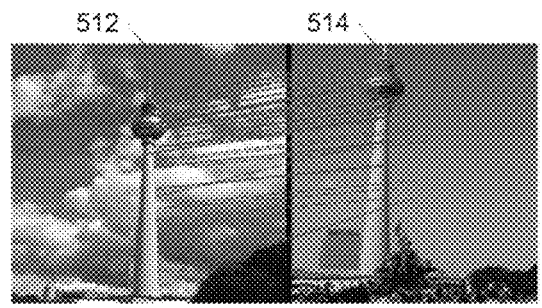
Figure 7B:
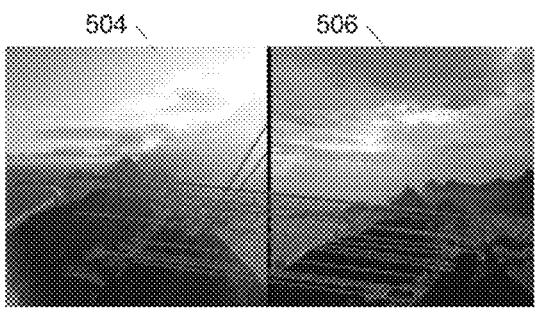
Figure 7E:
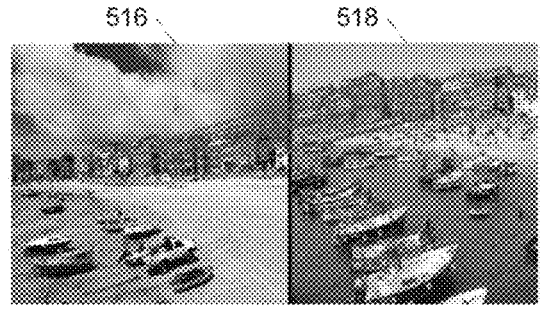
Figure 7C:
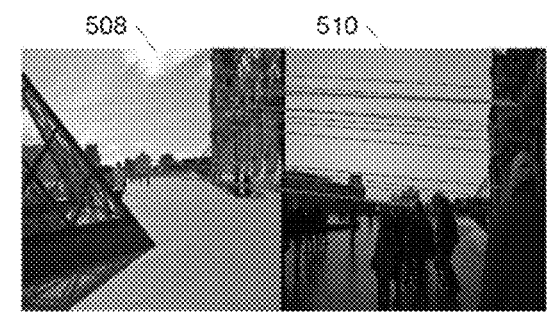
Figure 7F:
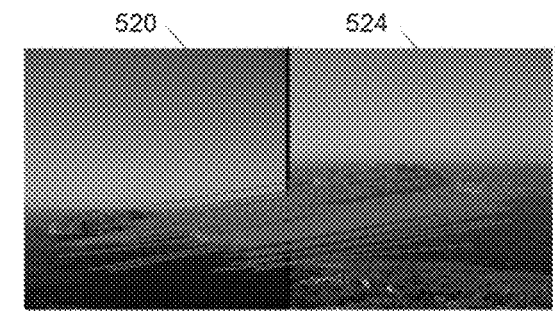

Referring now to FIGS. 7a-7f, each such figure provides a side-by-side depiction of an example query image and a corresponding database image retrieved as a matching image associated with its respective query image. More particularly, FIG. 7a illustrates a first example query image 500 and first example database image 502 retrieved from a plurality of database images as matching first example query image 500. FIG. 7b illustrates a second example query image 504 and second example database image 506 retrieved from a plurality of database images as matching second example query image 504. FIG. 7c illustrates a third example query image 508 and third example database image 510 retrieved from a plurality of database images as matching third example query image 508. FIG. 7d illustrates a fourth example query image 512 and fourth example database image 514 retrieved from a plurality of database images as matching fourth example query image 512. FIG. 7e illustrates a fifth example query image 516 and fifth example database image 518 retrieved from a plurality of database images as matching fifth example query image 516. FIG. 7f illustrates a sixth example query image 520 and sixth example database image 522 retrieved from a plurality of database images as matching sixth example query image 520.

Feature correspondences between each query image 500, 504, 508, 512, 516, and 520 and its associated database image 502, 506, 510, 514, 518, and 522 are depicted using connector lines between corresponding features. Connector lines connect the center of receptive fields for matching features. Since the receptive fields can be fairly large, some features may appear to be localized in indiscriminative regions (e.g., ocean or sky). However, in these cases, the features take into account more discriminative features in the neighboring area. FIGS. 7a-7f are representative of actual results for an image descriptor model and image retrieval application implemented in accordance with the disclosed techniques. FIGS. 7a-7f indicate successful matching between landmarks and objects in challenging environments including partial occlusion, distracting objects, and background clutter.

FIGS. 8-11, respectively, set forth aspects associated with one or more computer-implemented methods according to example embodiments of the present disclosure. In some embodiments, the computer-implemented methods of FIGS. 8-11 can include other features or steps disclosed herein. In some embodiments, a computing device, computing system, image retrieval system or other example system or device as described with reference to FIGS. 1-6 or other example systems or devices can implement some or all of the methods depicted in FIGS. 8-11. In some embodiments, one or more tangible, non-transitory computer-readable media storing computer-readable instructions that when executed by one or more processors cause the one or more processors to perform operations, the operations comprising steps as set forth in one or more of the methods depicted in FIGS. 8-11.

Figure 8:
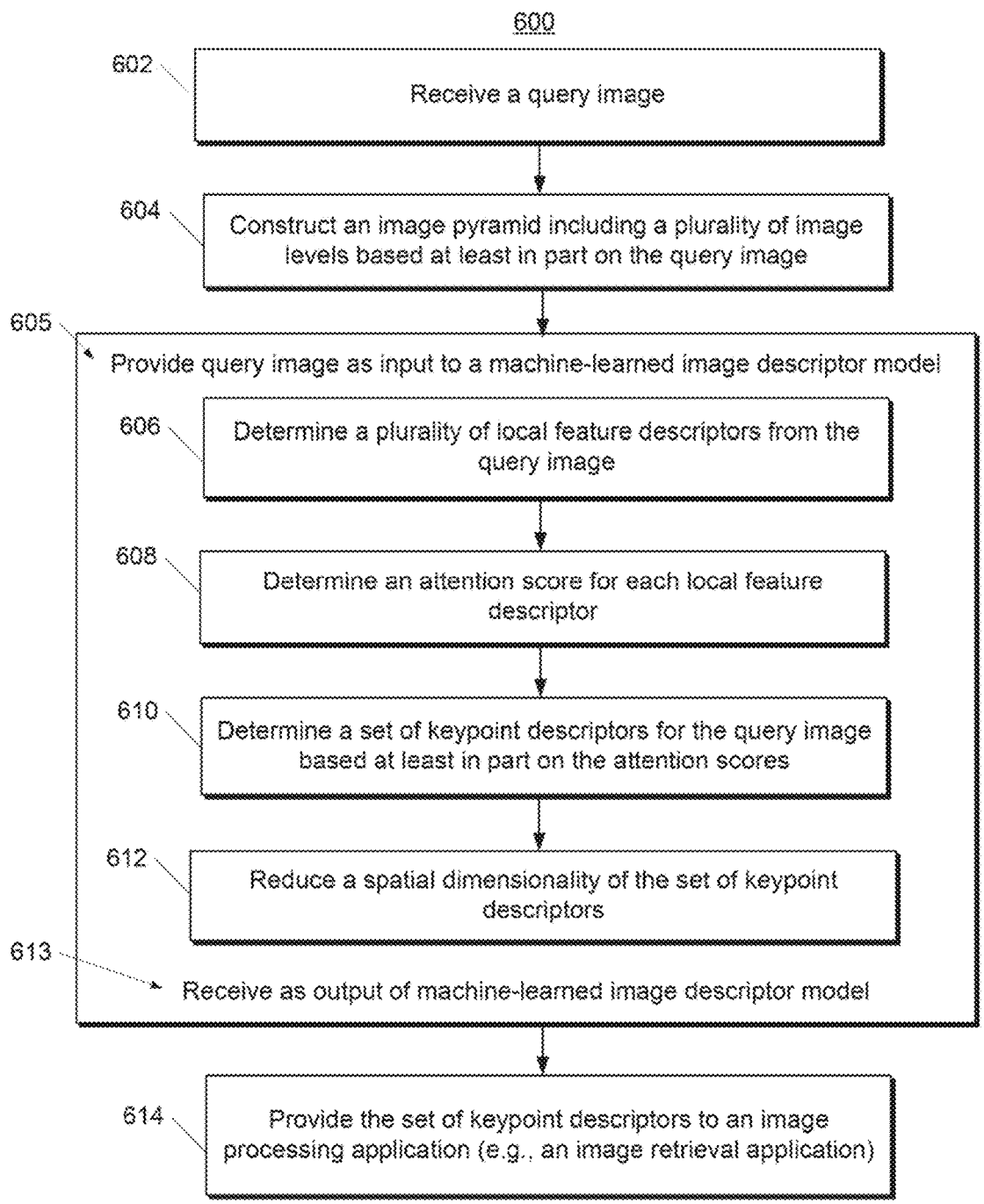
FIG. 8 depicts a flow chart diagram of an example method of determining image descriptors according to example embodiments of the present disclosure.

FIG. 8 depicts a flow chart diagram of an example method 600 of determining image descriptors according to example embodiments of the present disclosure.

At 602, a computing system can receive or otherwise obtain access to a query image. At 604, the computing system can optionally construct an image pyramid from the query image received at 602. The image pyramid constructed at 604 can include a plurality of image levels based at least in part on the query image received at 602. The computing system can then input each of the plurality of image levels within the image pyramid constructed at 604 into an image descriptor model, independently at 605. By employing such an image pyramid constructed at 604, local features can be determined that describe image regions of different sizes thus accommodating scale changes across images. In some implementations, image pyramids can be constructed at 604 by using scales that are separated by a predetermined factor (e.g., $\sqrt{2}$). In some implementations, an image pyramid construction scale applied in image pyramid construction at 604 is inversely proportional to a receptive field associated with the machine-learned image descriptor model (e.g., a neural network) to which images are provided as input at 805.

At 606, a computing system can determine a plurality of local feature descriptors from the query image received at 602. At 608, the computing system can determine an attention score for each local feature descriptor. At 610, the computing system can determine a set of keypoint descriptors for the query image based at least in part on the attention scores determined at 608. The set of keypoint descriptors determined at 610 can correspond to a subset of the local feature descriptors determined at 606, the subset being selected based on the attention scores determined at 608. In some implementations, the set of keypoint descriptors determined at 608 can include a predetermined number of local feature descriptors having the highest attention scores for the query image.

At 612, the computing system can reduce a spatial dimensionality of the set of keypoint descriptors determined at 610 for the query image received at 602. Dimensionality reduction implemented at 612 can be especially useful for image processing applications such as image retrieval, by selecting a tailored number of keypoint descriptors to obtain improved retrieval accuracy. Example dimensionality reduction techniques can include, for example, normalization (e.g., L1 or L2 normalization), principle component analysis (PCA), missing values ratios, low variance filters, high correlation filters, random forests, ensemble trees, backward feature elimination, forward feature construction, and other appropriate dimensionality reduction techniques. In some implementations, for example, reducing a spatial dimensionality at 612 can include at least first and second dimensionality reduction steps. In some instances, the at least first and second dimensionality reduction steps can use similar techniques while in other instances, the at least first and second dimensionality reduction steps can use different techniques. In one particular example, implementation of L2 normalization can be followed by Principle Component Analysis (PCA) implementation, followed by another round of L2 normalization.

In some implementations, determining a plurality of local feature descriptors at 606, determining attention scores at 608, determining a set of keypoint descriptors at 610, and implementing dimensionality reduction at 612 can be implemented by a machine-learned image descriptor model (e.g., image descriptor model 112 or 140 of FIG. 1, image descriptor model 200 of FIG. 2, machine-learned image descriptor model 220 of FIG. 3, image descriptor model 302 of FIG. 4, or image descriptor model 400 of FIG. 5). In such instances, a computing system can obtain data descriptive of such machine-learned model, wherein the machine-learned image descriptor model has been trained to receive one or more input images and, in response to receipt of the one or more input images, provide a set of keypoint descriptors, each keypoint descriptor describing a selected local feature determined from the one or more input images. At 605, a computing system can provide the query image received at 602 (or the respective image levels of the image pyramid constructed at 604) as input to a machine-learned image descriptor model. At 613, a computing system can receive, as an output of the machine-learned image descriptor model, a set of keypoint descriptors, each keypoint descriptor describing a selected local feature determined from the query image received at 602 (or image levels of the image pyramid constructed at 604) provided as input to the machine-learned image descriptor model at 605.

At 614, the computing system can provide the set of keypoint descriptors to an image processing application (e.g., an image retrieval application). When the computing system provides the set of keypoint descriptors to an image retrieval application, one or more additional steps can be implemented such as described, for example, with reference to FIG. 10.

Figure 9:
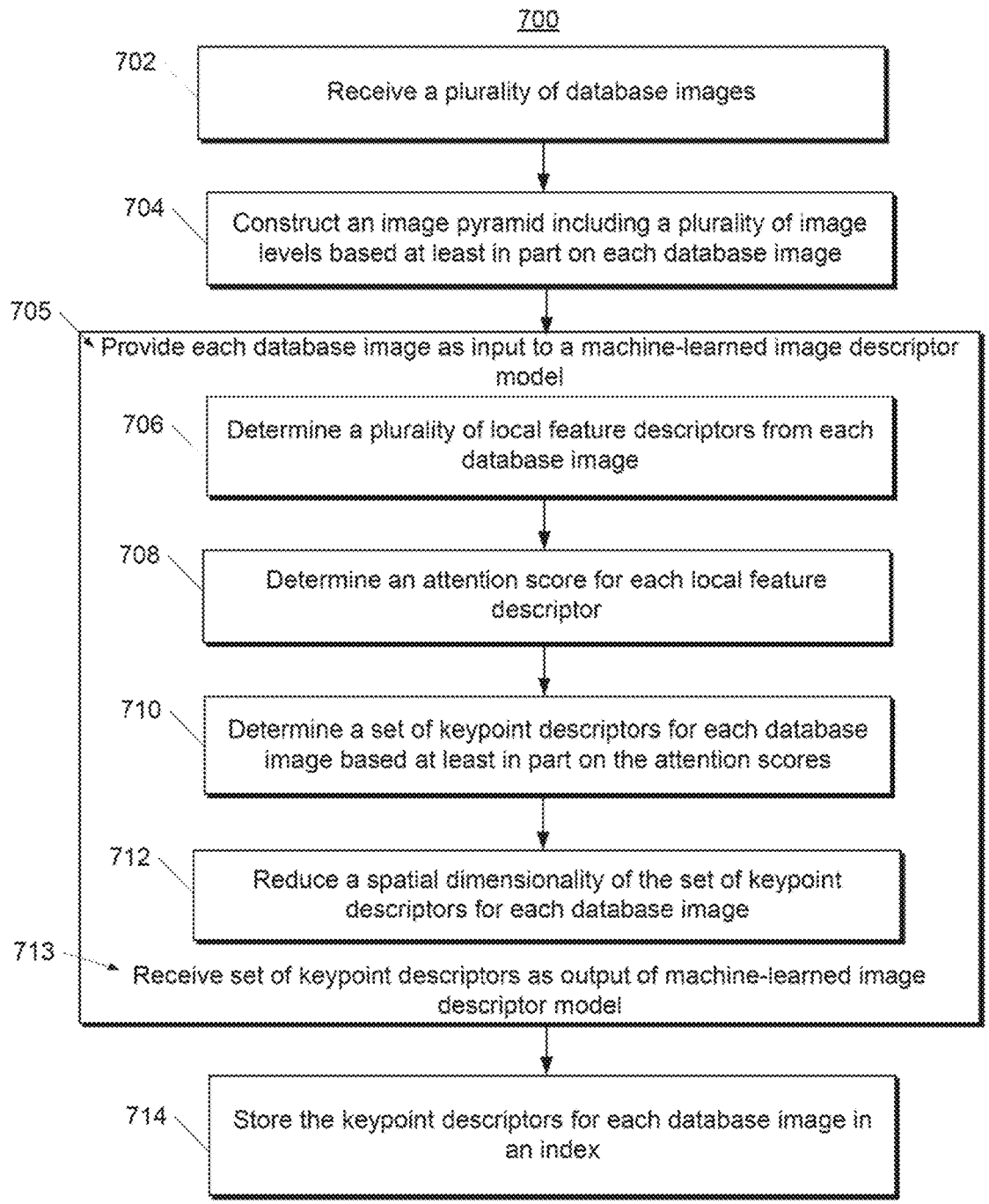
FIG. 9 depicts a flow chart diagram of an example method of generating a large-scale index of keypoint descriptors associated with a plurality of database images.

FIG. 9 depicts a flow chart diagram of an example method 700 of generating a large-scale index of keypoint descriptors (e.g., index 304 of FIG. 4) associated with a plurality of database images (e.g., database images 308 of FIG. 4).

At 702, a computing system can receive or otherwise obtain access to a plurality of database images. At 704, the computing system can optionally construct an image pyramid from each database image received at 702. The image pyramid constructed at 704 can include a plurality of image levels based at least in part on each database image received at 702. The computing system can then input each of the plurality of image levels within the image pyramid constructed at 704 into an image descriptor model, independently at 705. By employing such an image pyramid constructed at 704, local features can be determined that describe image regions of different sizes thus accommodating scale changes across images. In some implementations, image pyramids can be constructed at 704 by using scales that are separated by a predetermined factor (e.g., $\sqrt{2}$). In some implementations, an image pyramid construction scale applied in image pyramid construction at 704 is inversely proportional to a receptive field associated with the machine-learned image descriptor model (e.g., a neural network) to which images are provided as input at 705.

At 706, a computing system can determine a plurality of local feature descriptors from each database image received at 702. At 708, the computing system can determine an attention score for each local feature descriptor. At 710, the computing system can determine a set of keypoint descriptors for each database image based at least in part on the attention scores determined at 708. The set of keypoint descriptors determined at 710 can correspond to a subset of the local feature descriptors determined at 706, the subset being selected based on the attention scores determined at 708. In some implementations, the set of keypoint descriptors determined at 708 can include a predetermined number of local feature descriptors having the highest attention scores for the query image.

At 712, the computing system can reduce a spatial dimensionality of the set of keypoint descriptors determined at 710 for each database image received at 702. Dimensionality reduction implemented at 712 can be especially useful for image processing applications such as image retrieval, by selecting a tailored number of keypoint descriptors to obtain improved retrieval accuracy. Example dimensionality reduction techniques can include, for example, normalization (e.g., L1 or L2 normalization), principle component analysis (PCA), missing values ratios, low variance filters, high correlation filters, random forests, ensemble trees, backward feature elimination, forward feature construction, and other appropriate dimensionality reduction techniques. In some implementations, for example, reducing a spatial dimensionality at 712 can include at least first and second dimensionality reduction steps. In some instances, the at least first and second dimensionality reduction steps can use similar techniques while in other instances, the at least first and second dimensionality reduction steps can use different techniques.

In one particular example, implementation of L2 normalization can be followed by Principle Component Analysis (PCA) implementation, followed by another round of L2 normalization.

In some implementations, determining a plurality of local feature descriptors at 706, determining attention scores at 708, determining a set of keypoint descriptors at 710, and implementing dimensionality reduction at 712 can be implemented by a machine-learned image descriptor model (e.g., image descriptor model 112 or 140 of FIG. 1, image descriptor model 200 of FIG. 2, machine-learned image descriptor model 220 of FIG. 3, image descriptor model 302 of FIG. 4, or image descriptor model 400 of FIG. 5). In such instances, a computing system can obtain data descriptive of such machine-learned model, wherein the machine-learned image descriptor model has been trained to receive one or more input images and, in response to receipt of the one or more input images, provide a set of keypoint descriptors, each keypoint descriptor describing a selected local feature determined from the one or more input images. At 705, a computing system can provide each database image received at 702 (or the respective image levels of the image pyramid constructed at 704) as input to a machine-learned image descriptor model. At 713, a computing system can receive, as an output of the machine-learned image descriptor model, a set of keypoint descriptors for each database image, each keypoint descriptor describing a selected local feature determined from the query image received at 702 (or image levels of the image pyramid constructed at 704) provided as input to the machine-learned image descriptor model at 705. At 715, the computing system can store the set of keypoint descriptors for each database image in a dedicated memory storage device or location to generate the index.

FIG. 10 depicts a flow chart diagram of an example image retrieval method 800 according to example embodiments of the present disclosure.

At 802, a computing system can obtain a set of keypoint descriptors associated with a query image. Obtaining a set of keypoint descriptors associated with a query image at 802 can correspond, for example, to obtaining the set of keypoint descriptors determined for a query image in the example method 600 of FIG. 8.

At 804, a computing system can access an index of keypoint descriptors associated with a plurality of database images. Accessing an index of keypoint descriptors associated with a plurality of database images at 804 can correspond, for example, to accessing the index generated and stored in the example method 700 of FIG. 9.

At 806, a computing system can determine a set of matching descriptors by analyzing the keypoint descriptors associated with the query image (e.g., the set of keypoint descriptors obtained at 802) relative to the set of keypoint descriptors stored in the index (e.g., the index accessed at 804). In some implementations, determining a set of matching descriptors at 806 can include implementing a nearest neighbor search among keypoint descriptors associated with the query image (e.g., keypoint descriptors obtained at 802) and keypoint descriptors associated with the plurality of database images (e.g., keypoint descriptors within the index accessed at 804).

At 808, the computing system can implement geometric verification, by geometrically verifying matching features associated with matching descriptors identified within a query image and one or more database images. In some implementations, geometric verification implemented at 808 can help identify and reject any false positive matching descriptor(s) included within the set of matching descriptors determined at 806.

At 810, the computing system can retrieve one or more matching images associated with the matching descriptors. At 812, the computing system can provide the one or more matching images (or information describing the one or more matching images) retrieved at 810 as output. For example, the one or more matching images (or information describing the one or more matching images) can be provided for display at 812 on a display device associated with the computing system. At 810 and/or 812, the computing system can create a local or remote copy of the matching image(s), obtain URL(s) for the matching image(s), generate thumbnail(s) of the matching image(s), and/or provide any other indication(s) or representation(s) of the matching image(s).

Figure 11:
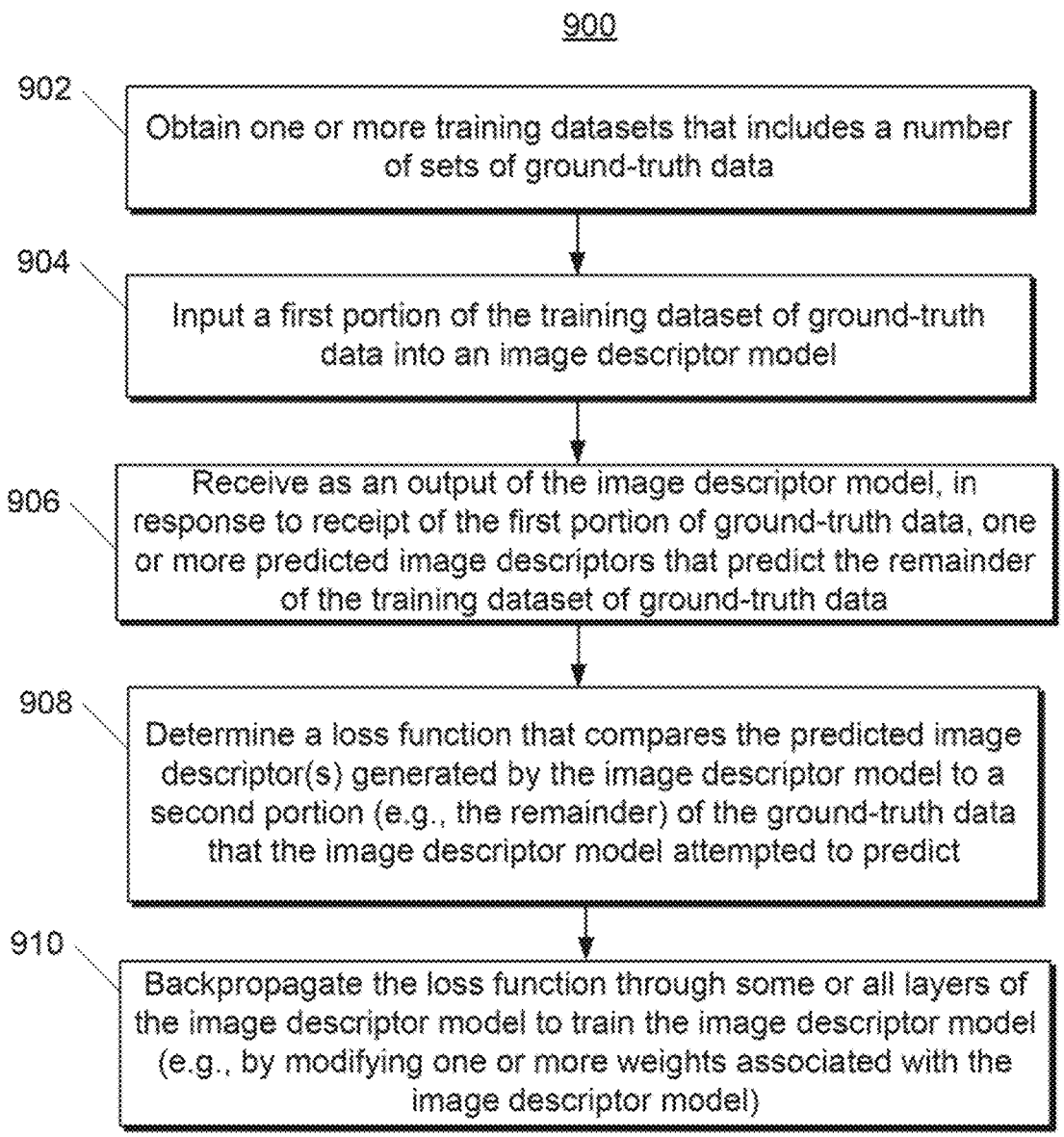
FIG. 11 depicts a flow chart diagram of an example method of training an image descriptor model according to example embodiments of the present disclosure.

FIG. 11 depicts a flow chart diagram of an example method 900 of training an image descriptor model according to example embodiments of the present disclosure. Method 900 can be used, for example, to train image descriptor model 112 of FIG. 1, image descriptor model 140 of FIG. 1, image descriptor model 200 of FIG. 2, machine-learned image descriptor model 220 of FIG. 3, image descriptor model 302 of FIG. 4, and/or image descriptor model 400 of FIG. 5.

At 902, a computing system can obtain one or more sets of training data that includes a number of sets of ground-truth data. The training data obtained at 902 can correspond, for example, to training data 402 depicted in FIG. 5 including a first portion 410 corresponding to a plurality of training images and a second portion 412 corresponding to image-level labels/annotations associated with the plurality of training images included within first portion 410. In some implementations, training data obtained at 902 can include training images captured at various different geographic locations and one or more corresponding geographic position labels (e.g., a set of GPS coordinates, an address, latitude/longitude/altitude values, or other suitable identifier(s) of geographic position). In some implementations, the training data obtained at 902 can include training images with labels including zero or more visual feature labels identifying landmarks, logos, products or other visual features included within the training images. In some implementations, the plurality of training images obtained at 902 can include one or more training images that do not contain any landmarks or other visual features. Such training images without visual features and corresponding labels can be referred to as distractors, which are helpful to include for adequately training an image descriptor model to robustly operate against queries that have no correct match within a plurality of database images.

At 904, the computing system can input a first portion of the training data obtained at 902 into an image descriptor model to be trained. At 906, the computing system can receive as an output of the image descriptor model, in response to receipt of the first portion of training data provided as input at 904, one or more predicted image descriptors that predict the remainder of the training dataset of ground-truth data. At 908, the computing system can determine a loss function that compares the predicted image descriptor(s) generated by the image descriptor model to a second portion (e.g., the remainder) of the ground-truth data that the image descriptor model attempted to predict. At 910, the computing system can backpropagate the loss function through some or all layers of the image descriptor model to train the image descriptor model (e.g., by modifying one or more weights associated with the image descriptor model).

The steps depicted at 902-910 respectively, can be repeated numerous times as part of training the image descriptor model in method 900.

In some implementations, method 900 of training an image descriptor model can include a two-part training procedure. For instance, a training computing system can train an image descriptor model using a first training process that implements a first set of steps 902-910 to learn determination of the one or more local feature descriptors and a second training process that implements a second set of steps 902-910 to learn determination of the attention scores for each of the one or more local feature descriptors given the determined local feature descriptors. In some implementations, the first training process can include determining a first loss function at 908 that can be backpropagated through the image descriptor model at 910 to train the feature extraction layers in the image descriptor model (e.g., by modifying one or more weights associated with the feature extraction layers within the image descriptor model). In some implementations, the second training process can determine a second loss function at 908 that can be backpropagated through the image descriptor model at 910 to train the attention-based keypoint selection layers in the image descriptor model (e.g, by modifying one or more weights associated with the attention-based keypoint selection layers within the image descriptor model).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8-11 respectively depict steps performed in a particular order for purposes of illustration and discussion, the methods of the present disclosure are not limited to the particularly illustrated order or arrangement. The various steps of the methods 600, 700, 800, and 900 can be omitted, rearranged, combined, and/or adapted in various ways without deviating from the scope of the present disclosure.

What is claimed is:

1. A computer-implemented method of image retrieval, comprising:

receiving, by a computing system comprising one or more computing devices, a query image;

determining, by the computing system, a plurality of local feature descriptors from the query image;

determining, by the computing system, an attention score for each local feature descriptor;

determining, by the computing system, a set of keypoint descriptors for the query image based at least in part on the attention scores, the set of keypoint descriptors corresponding to a subset of the local feature descriptors;

reducing, by the computing system, a spatial dimensionality of the set of keypoint descriptors for the query image; and retrieving, by the computing system, one or more images corresponding to the query image, based at least in part on the set of keypoint descriptors for the query image.

2. The computer-implemented method of image retrieval of claim 1, wherein the set of keypoint descriptors comprises a predetermined number of local feature descriptors having the highest attention scores for the query image.

3. The computer-implemented method of image retrieval of claim 1, further comprising:

receiving, by the computing system, a plurality of database images;

determining, by the computing system, a plurality of local feature descriptors for each database image;

determining, by the computing system, an attention score for the local feature descriptors associated with each database image; and determining, by the computing system, a set of keypoint descriptors for each database image based at least in part on the attention scores, the set of keypoint descriptors corresponding to a subset of the local feature descriptors for that database image; and wherein retrieving, by the computing system, one or more images corresponding to the query image comprises retrieving, by the computing system, one or more images from the plurality of database images based at least in part on the set of keypoint descriptors for the query image and the set of keypoint descriptors for each database image.

4. The computer-implemented method of image retrieval of claim 3, further comprising determining a set of matching features by comparing the keypoint descriptors associated with the query image with the keypoint descriptors associated with the plurality of database images, and wherein the set of matching features is used to retrieve the one or more matching images from the plurality of database images.

5. The computer-implemented method of image retrieval of claim 4, wherein determining a set of matching features comprises implementing a nearest neighbor search among keypoint descriptors associated with the query image and keypoint descriptors associated with the plurality of database images.

6. The computer-implemented method of image retrieval of claim 4, further comprising performing, by the computing system, geometric verification to evaluate the set of matching features across the query image and the one or more matching images.

7. The computer-implemented method of image retrieval of claim 1, further comprising:

constructing, by the computing system, an image pyramid based at least in part on the query image, the image pyramid comprising a plurality of image levels; and inputting each of the plurality of image levels into the machine-learned image descriptor model, independently.

8. One or more tangible, non-transitory computer-readable media storing computer-readable instructions that when executed by one or more processors cause the one or more processors to perform operations, the operations comprising:

obtaining data descriptive of a machine-learned image descriptor model, wherein the machine-learned image descriptor model has been trained to receive one or more input images and, in response to receipt of the one or more input images, determine one or more local feature descriptors in the one or more input images, determine an attention score for each of the one or more local feature descriptors, and provide a set of keypoint descriptors based at least in part on the attention score for each of the one or more local feature descriptors, each keypoint descriptor describing a selected local feature determined from the one or more input images such that the set of keypoint descriptors corresponds to a subset of the local feature descriptors;

obtaining a query image;

inputting the query image into the machine-learned image descriptor model;

receiving, as an output of the machine-learned image descriptor model, a set of keypoint descriptors, each keypoint descriptor describing a selected local feature determined from the query image and selected based on a respective attention score generated for the selected local feature by the machine-learned image descriptor model; and providing the set of keypoint descriptors as to an image processing application.

9. The one or more tangible, non-transitory computer-readable media of claim 8, wherein the machine-learned image descriptor model has been trained based on a set of training data that includes a first portion of training data corresponding to a plurality of training images and a second portion of training data corresponding to image-level labels associated with the plurality of training images.

10. The one or more tangible, non-transitory computer-readable media of claim 9, wherein the image-level labels included within the second portion of training data comprise one or more of a visual feature label and a geographic position label.

11. The one or more tangible, non-transitory computer-readable media of claim 10, wherein one or more of the plurality of training images do not contain a visual feature.

12. The one or more tangible, non-transitory computer-readable media of claim 8, wherein the machine-learned image descriptor model comprises a convolutional neural network.

13. The one or more tangible, non-transitory computer-readable media of claim 8, wherein the machine-learned image descriptor model has been trained based on a first training process to learn determination of the one or more local feature descriptors and a second training process to learn determination of the attention score for each of the one or more local feature descriptors given the determined local feature descriptors.

14. The one or more tangible, non-transitory computer-readable media of claim 13, wherein the machine-learned image descriptor model has been trained based on a set of training data that includes a plurality of training images, and wherein the plurality of training images are randomly resealed during the second training process.

15. The one or more tangible, non-transitory computer-readable media of claim 8, wherein the machine-learned image descriptor model comprises a plurality of shared layers that are used at least in part for both determining the one or more local feature descriptors and for determining an attention score for each of the one or more local feature descriptors.

16. The one or more tangible, non-transitory computer-readable media of claim 8, the operations further comprising:
   obtaining a plurality of database images;
   inputting the plurality of database images into the machine-learned image descriptor model;
   receiving, as an output of the machine-learned image descriptor model, a set of keypoint descriptors, each keypoint descriptor describing a selected local feature identified from the plurality of database images;
   determining a set of matching features by comparing the keypoint descriptors associated with the query image with the keypoint descriptors associated with the plurality of database images; and
   generating an output based at least in part on the set of matching features.

17. The one or more tangible, non-transitory computer-readable media of claim 16, wherein determining a set of matching features comprises implementing a nearest neighbor search among keypoint descriptors associated with the query image and keypoint descriptors associated with the plurality of database images.

18. The one or more tangible, non-transitory computer-readable media of claim 16, wherein generating an output based at least in part on the set of matching features comprises retrieving one or more matching images from the plurality of database images having a matching feature.

19. An image retrieval system, comprising:
   at least one processor;
   a machine-learned image descriptor model, the machine-learned image descriptor model trained to receive an image and, in response to receipt of the image, determine one or more local feature descriptors in the one or more input images, determine an attention score for each of the one or more local feature descriptors, and output a set of keypoint descriptors, the set of keypoint descriptors having been selected as a subset of the local feature descriptors based at least in part on the attention scores determined by the machine-learned image descriptor model for the local feature descriptors;
   an index of keypoint descriptors determined by providing a plurality of database images as input to the machine-learned image descriptor model; and
   at least one tangible, non-transitory computer-readable medium that stores instructions that, when executed by the at least one processor, cause the at least one processor to perform operations, the operations comprising:
      receiving a query image;
      inputting the query image into the machine-learned image descriptor model;
      receiving, as an output of the machine-learned image descriptor model, a set of keypoint descriptors associated with the query image, the set of keypoint descriptors having been selected as a subset of local feature descriptors based at least in part on attention scores determined by the machine-learned image descriptor model for the local feature descriptors;
      determining a set of matching features by comparing the set of keypoint descriptors associated with the query image with the index of keypoint descriptors; and
      retrieving at least one matching image based on the set of matching features.

* * * * *